United States Patent [19]
Kakumoto et al.

[11] Patent Number: 5,144,679
[45] Date of Patent: Sep. 1, 1992

[54] GRAPHIC DATA SEARCHING AND STORAGE METHOD

[75] Inventors: Shigeru Kakumoto, Tokorozawa; Masayasu Kato, Hitachi; Fumitaka Otsu, Funabashi; Kazuo Watanabe, Isehara, all of Japan

[73] Assignees: Hitachi, Ltd, Tokyo; Hitachi Seiko, Ltd., Kanagawa, both of Japan

[21] Appl. No.: 650,404

[22] Filed: Feb. 4, 1991

Related U.S. Application Data

[63] Continuation of Ser. No. 496,181, Mar. 20, 1990, Pat. No. 5,099,520, which is a continuation of Ser. No. 67,013, Jun. 29, 1987, abandoned.

[30] Foreign Application Priority Data

Feb. 19, 1990 [JP] Japan .................................... 2-36038

[51] Int. Cl.⁵ .............................................. G06K 9/00
[52] U.S. Cl. .......................................... 382/1; 382/61; 340/747
[58] Field of Search .................... 382/1, 22, 25, 48, 56, 382/61; 340/747, 748, 798, 799

[56] References Cited

U.S. PATENT DOCUMENTS

| | | | |
|---|---|---|---|
| 4,760,390 | 7/1988 | Maine et al. | 340/747 |
| 4,803,477 | 2/1989 | Miyatake et al. | 340/747 |
| 4,811,411 | 3/1989 | Hashihara et al. | 382/41 |
| 4,894,646 | 1/1990 | Ryman | 340/747 |

FOREIGN PATENT DOCUMENTS 117077 7/1983 Japan .

Primary Examiner—Jose L. Couso
Attorney, Agent, or Firm—Fay, Sharpe, Beall, Fagan, Minnich & McKee

[57] ABSTRACT

In correspondence with the graphic data having a spatial extent, there is the address data table configured of arrays, the dimension of which are not smaller in number than the dimensions of the extent of the graphic data. Coordinate transformation is performed between the graphic data and the address data table, whereby any desired point on each figure can be brought into correspondence with one array number of the address data table. Those memory addresses of a graphic data table at which the individual graphic data items are sorted, are subsequently stored in the address data table. In case of searching for graphic data located at any desired position, the corresponding array number of the address data table is obtained on the basis of the position, whereupon the desired figure can be searched for through that memory address to the graphic data which is stored. In a case where the memory space of the address data table corresponding to any desired one of cells (each of which is a subspace of a graphic space) is full, relevant information of indirectly utilizing a memory space assigned to another of the cells is substitutionally stored in the address data table, conjointly with the memory address of the graphic data table storing the corresponding graphic data so that the address data table can be used efficiently. When the figure discriminators of the graphic data are stored in the address data, lines or points, the relevant attribute information items, or the like can be extracted selectively and efficiently by deciding the figure discriminators on the searching operation.

40 Claims, 12 Drawing Sheets

| | A | B | C | D |
|---|---|---|---|---|
| X(I-1,J+1) 116 | | 1 | AD P3 K | 3 |
| | | 0 | AD P3 K+1 | 3 |
| X(I,J+1) | | 0 | AD P2 J | 3 |
| 117 | | 1 | AD P2 J+1 | 3 |
| X(I+1,J+1) 115 | | 1 | AD P2 J | 3 |
| | | 1 | AD P3 K+1 | 2 |
| X(I-1,J) | | 0 | AD P3 K | 3 |
| 111 | | 0 | AD Am | 5 |
| X(I,J) 112 | | 0 | AD P1 i+1 | 1 |
| 113 X(I+1,J) | | 0 | AD P1 i | 3 |
| 114 | | 1 | AD P2 J+1 | 2 |
| | | 0 | AD P2 J+1 | 3 | arrows: iv → row 116; iii → row 117; ii → row 115; v → row with K+1,2; i → row 114

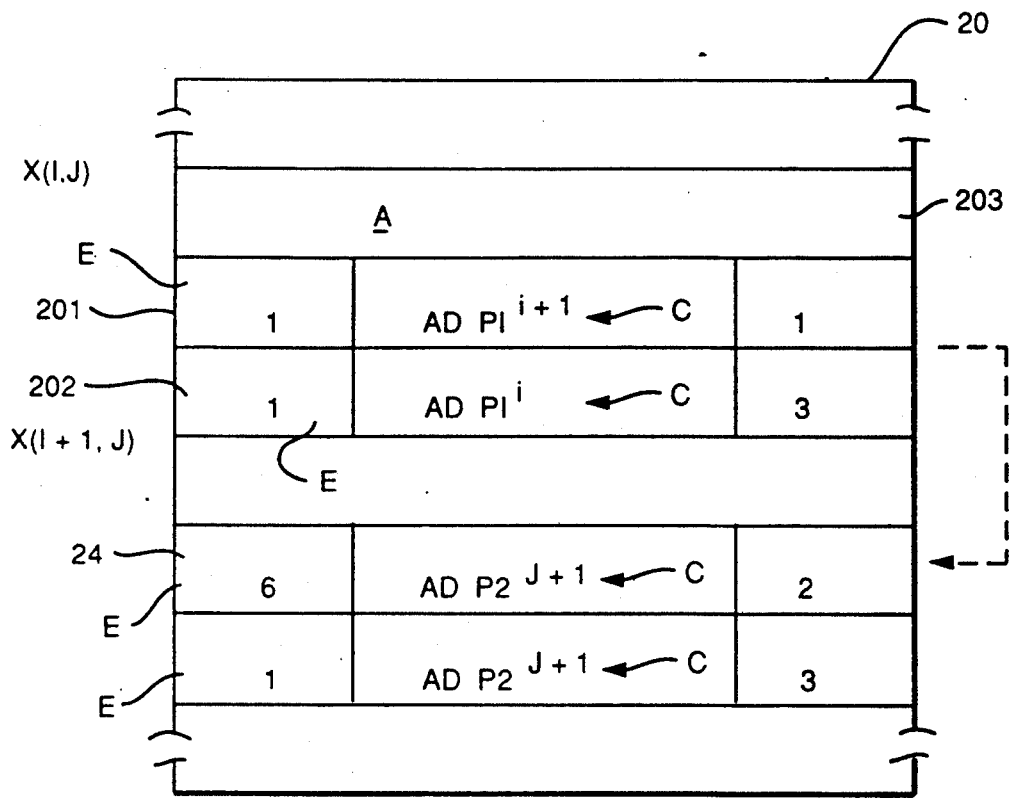
FIG. 2(a)
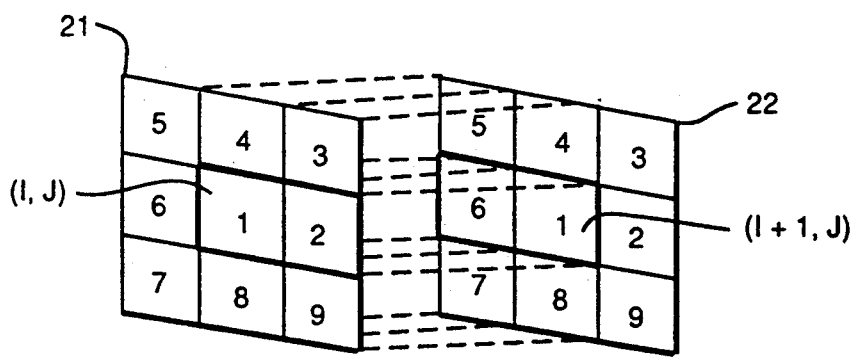
(CENTER CELL (I, J))   (CENTER CELL (I+1, J))
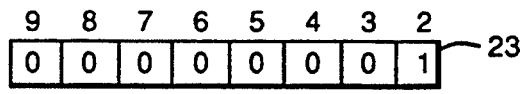
FIG. 2(b)

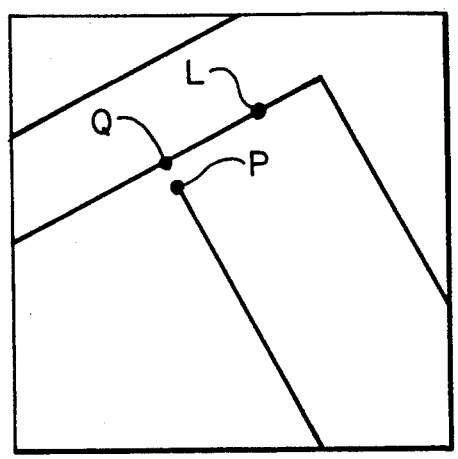
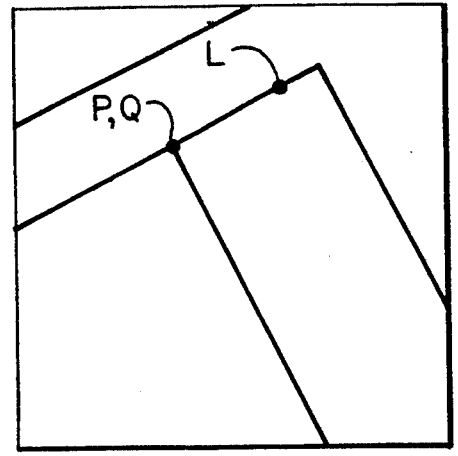
FIG. 5(a)  FIG. 5(b)
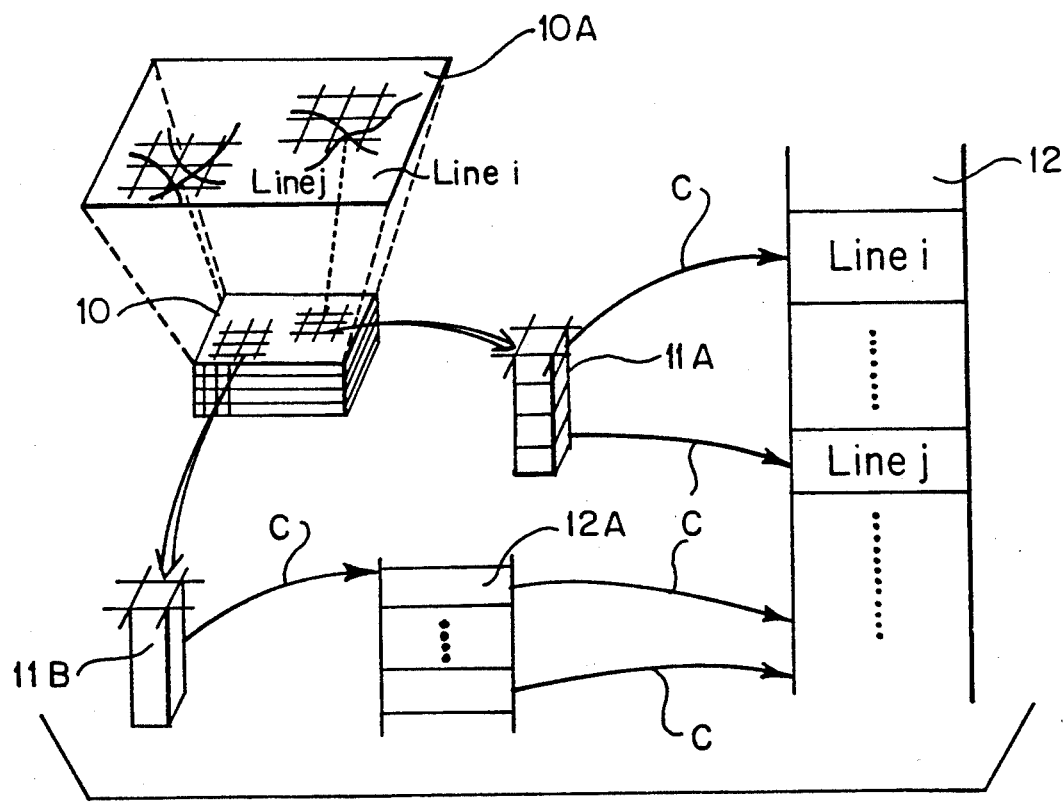
FIG. 8

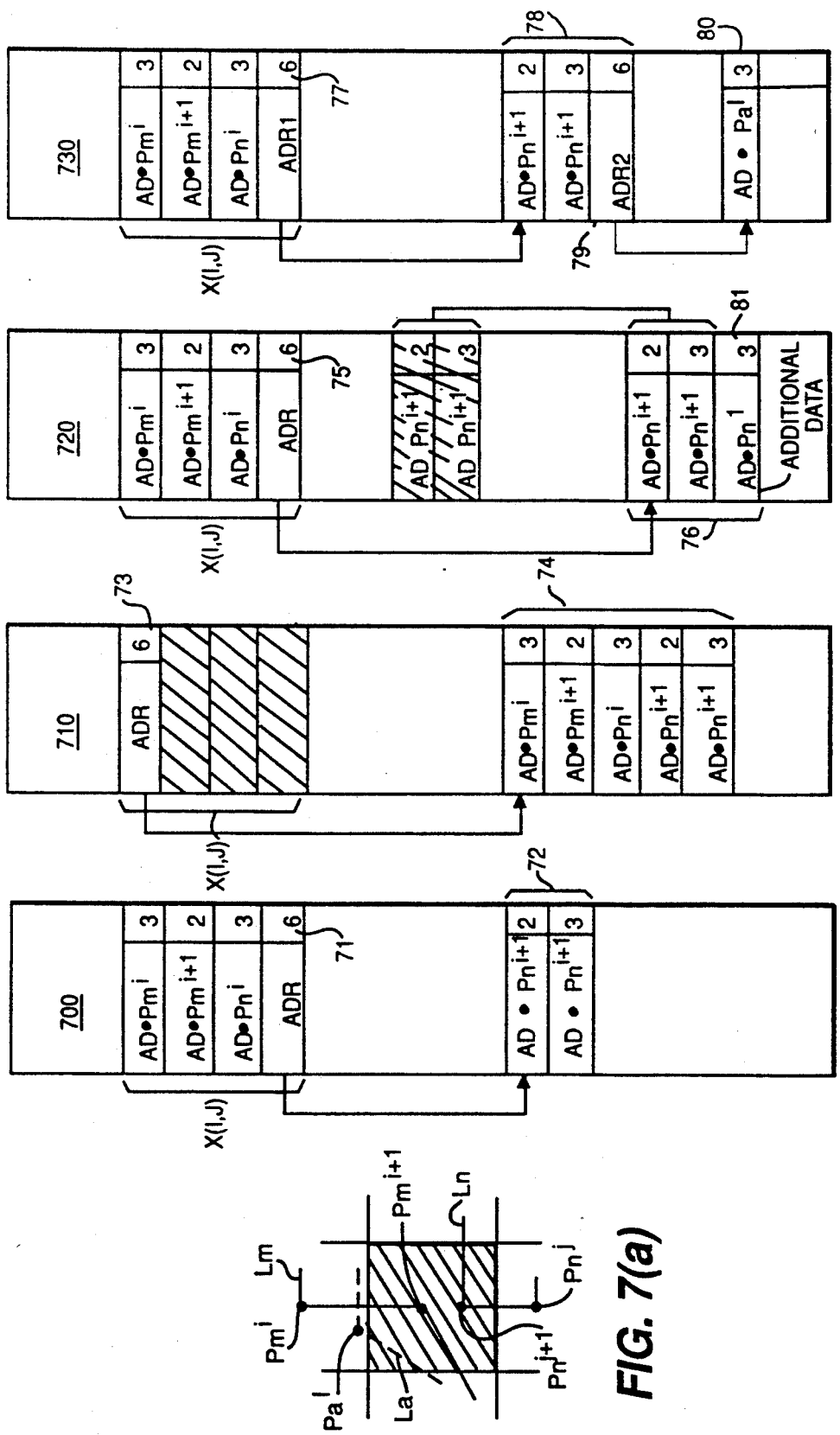

FIG. 11

GRAPHIC DATA SEARCHING AND STORAGE METHOD

The present invention is a continuation in part of Ser. No. 07/496,181 filed Mar. 20, 1990, now U.S. Pat. No. 5,099,520 which is a continuation of Ser. No. 07/067,013 filed Jun. 29, 1987, now abandoned.

BACKGROUND OF THE INVENTION

The present invention relates to a method wherein graphic data items input into a computer are stored in a memory and searched to seek out certain graphic data. More particularly, it relates to a graphic data searching and storing method well suited to quickly search for a figure at any desired position and to efficiently use a memory.

Regarding the search of graphic data, Japanese Patent Application Laid-Open number 117077/1983 proposes a method wherein a figure is searched for by the use of two tables. An address data table has addresses of memory areas storing the graphic data. A management table, with respect to each of subspaces obtained by dividing a coordinate space covering all the graphic data into suitable small cells, stores coordinates representative of the subspace held in correspondence with spatial addresses on the address data table storing the addresses of figures passing through the cell.

SUMMARY

The prior art technique has had the following problems:

(1) In case of searching for any desired figure, the management table hierarchically classified into several stages needs to be referred to. This forms an obstacle to heightening the speed of graphic processing.

(2) For the purpose of making this method effective, the figures contained in the cells must lie in regular order in the address data table. Accordingly, when a figure is added or deleted, it is necessary to sort address data items and to rearrange them so that the figures contained in the cells may lie in regular order.

(3) The method does not have the function of selectively searching lines constituting the figures, the end points and node points of the lines, etc. Therefore, in a case where only the points of designated positions on the lines are to be searched, by way of example, it is required to first search all prospective figures and to subsequently extract the desired points. The requirement renders the efficiency of the search inferior.

It is accordingly an object of the present invention to propose an efficient method for searching and storing graphic data, which method solves these problems on the search of the graphic data.

The object is accomplished in such a way that addresses of memory storing graphic data are stored in an address data table described by a multidimensional array held in correspondence with positional coordinates, and that the unused memory spaces of the address data table are indirectly utilized for unassigned coordinates, thereby to enhance the efficiency of use of a memory. Besides, in case of searching (i) end points and (ii) node points of lines constituting graphic data, (iii) other points on the lines, (iv) points constituting a surface, and (v) relevant attribute information, only addressed storing of the graphic data or attribute information which fulfills the condition to be dealt with in the address data table are searched. Figure discriminators corresponding to the respective items are cojointly stored in the address data table, whereby an efficient search for figures or the attribute information is achieved.

According to the present invention, in correspondence with the graphic data having a spatial extent, there is the address data table configured of arrays, the dimension of which are not smaller in number than the dimensions of the extent of the graphic data. Coordinate transformation is performed between the graphic data and the address data table, whereby any desired point on each figure can be brought into correspondence with one array number of the address data table. Those memory addresses, of a graphic data table at which the individual graphic data items are sorted, are subsequently stored in the address data table. In case of searching for graphic data located at any desired position, the corresponding array number of the address data table is obtained on the basis of the position, whereupon the desired figure can be searched for through that memory address to the graphic data which is stored. In a case where the memory space of the address data table corresponding to any desired one of cells (each of which is a subspace of a graphic space) is full, relevant information of indirectly utilizing a memory space assigned to another of the cells is substitutionally stored in the address data table conjointly with the memory address of the graphic data table storing the corresponding graphic data so that the address data table can be used efficiently. When the figure discriminators of the graphic data are stored in the address data, lines or points, the relevant attribute information items, or the like can be extracted selectively and efficiently by deciding the figure discriminators on the searching operation.

BRIEF DESCRIPTION OF THE DRAWINGS

Further objects, features and advantages of the present invention will become more clear from the following detailed description of preferred embodiments as shown in the drawing, wherein:

FIGS. 2(*a*) to (*b*) are diagrams showing the formats of an address data table, etc. in Embodiment 2;

FIGS. 5 (*a*) and (*b*) are diagrams showing the method of T-shaped connection processing:

FIGS. 7(*a*) through 7(*e*) are diagrams showing the arrangements of address data items in the case where an overflow has occurred;

FIG. 8 is useful for explaining the parent invention, of which the present invention is a continuation in part;

FIG. 11 shows an example of the number of pointers for a map; and

Storing graphic data according to the present invention will be described with reference to FIG. 1.

Figure 1A:
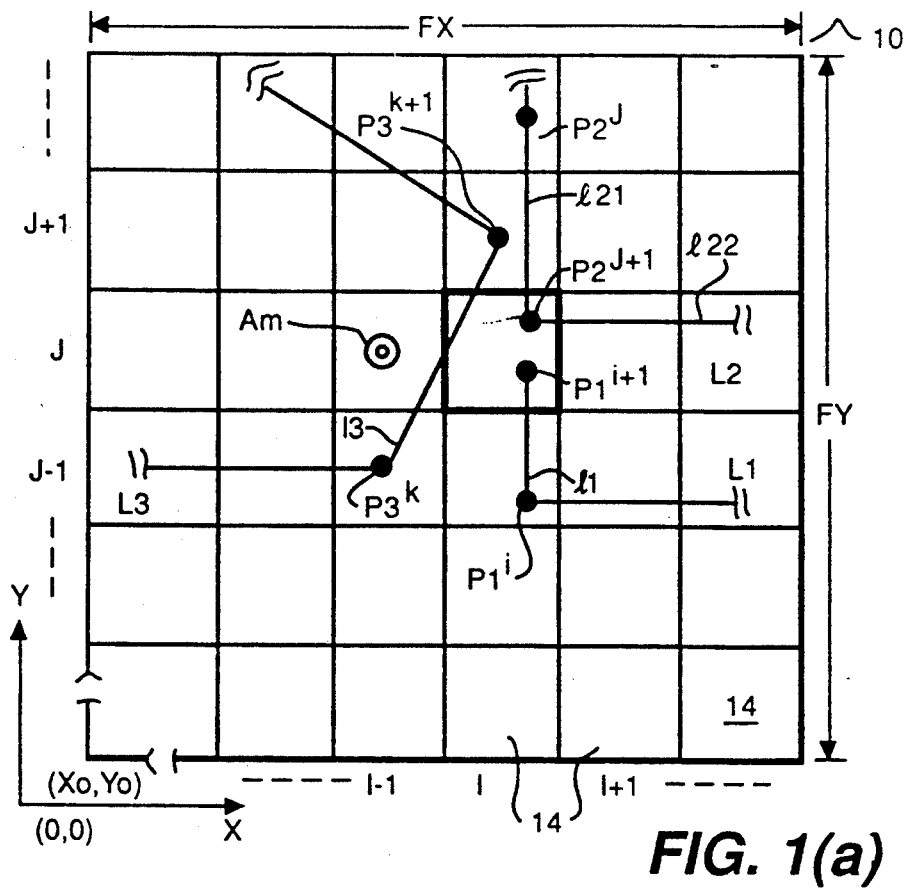
FIGS. 1(*a*)–(*g*) are diagrams showing the formats of a graphic data table, an address data table, an attribute information table, etc. in Embodiment 1.
Figure 1B:
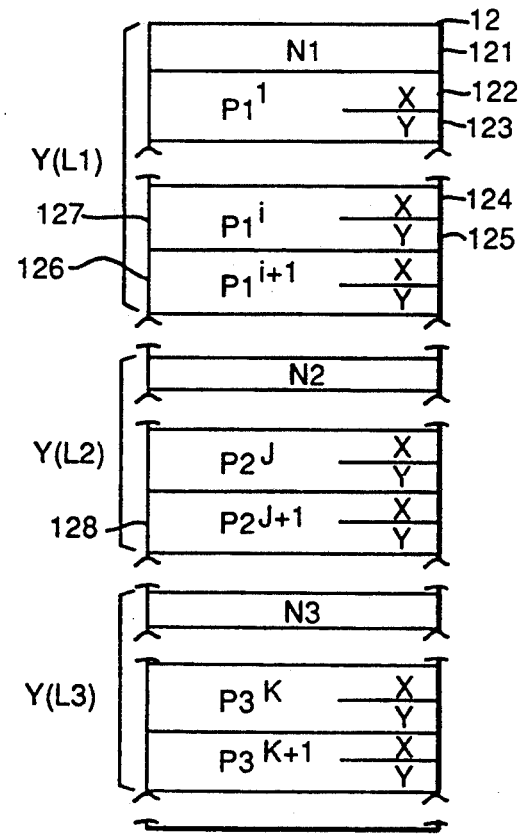
Figures 1C, 1D, 1E:
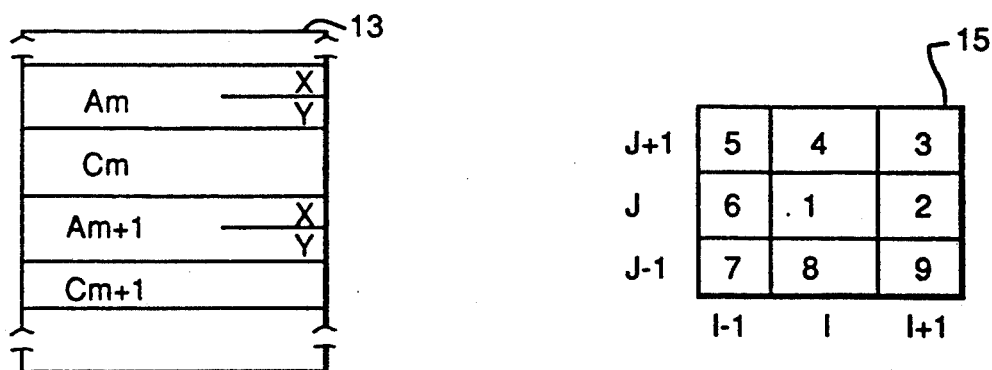

First, there are shown examples of a graphic data table 12 for storing the graphic data and an attribute information table 13 for storing attribute information, respectively in FIGS. 1(b) and 1(d). In the graphic data table 12, $N_m$ denotes the number of points (graphic data items) constituting the m-th figure, symbol $P_m{}^n$ denotes the n-th point (graphic data item) constituting a part of the m-th figure, and letters X and Y written at the right of the symbol $P_m{}^n$ denote the X-coordinate and Y-coordinate values of the point $P_m{}^n$, respectively.

In the attribute information data table 13, $A_m$ denotes the m-th attribute information, letters X and Y written at the right of $A_m$ denote the X-coordinate and Y-coordinate values of the attribute information, respectively, and symbol $C_m$ denotes the content of the attribute information. The attribute information items are stored in relation to X- and Y-coordinates on the drawing. By way of example, the attribute information items are coordinates on a map at which the symbol of a temple lies and the name of the temple, which is the content of the attribute information. In this embodiment, memory addresses of the graphic data table and the attribute information data table, concerning such digitized two-dimensional linear figures and attribute information items, are registered in address data table 11 of FIG. 1(c).

In FIG. 1(a) there is shown a space 10 where FIGS. $1_1$, $1_3$, $1_{21}$, $1_{22}$ depicted on the drawing exist. The drawing has a two-dimensional extent, in which (0,0) indicates on FIG. 1 that the lower left hand corner is taken as the origin, and X- and Y-directions are determined as indicated. The coordinate space 10 which covers the figures, is equally divided in the respective directions X an Y into subspaces 14 called "cells". In the address data table 11 of FIG. 1(c), fixed location memory spaces 111 are each of fixed capacity and are held in correspondence with the respective cells 14. Each cell 14 on the drawing is identified by its coordinates (I,J), while the starting address of the fixed-capacity memory space of the address data table 11 corresponding to each cell is expresses as X(I,J), which is a function of the drawing coordinates of the respective cells. The fixed capacity memory space 111 at X(I,J) corresponding to the cell (I,J) is subdivided in a fixed number DP, and the subdivided spaces can be considered as arrays. The number DP is the number of graphic data storing addresses which can be registered in the memory spaces X(I,J) corresponding the the cell (I,J). When the K-th one of the storing addresses has address data, it is expressed as X(I, J,K). DP=2 is set for each cell in this embodiment. In correspondence with the cell (I,J), the fixed-capacity memory space 111 at X(I,J) is subdivided in two (DP=2) memory subspaces 112 and 113. The head addresses of the memory subspaces 112 and 113 are computed using the values of I,J, and K.

In a case where the storing addresses of all of the graphic data items, attribute information items, etc. passing through the cell (I,J) cannot be stored in the memory space at X(I,J) corresponding to this cell, some of them are substitutionally stored in the memory spaces corresponding to the cells nearby. To this end, each memory subspace at X(I,J,K) stores therein a substitution discriminator A for indicating that substitutional address data is stored and an inclusion-exclusion discriminator B for distinguishing whether the stored address data is one of another cell. Besides the substitution discriminator A and the inclusion-exclusion discriminator B, each memory subspace at X(I,J,K) registers therein address data C for indicating the head address of that space in the graphic data table 12 or the attribute information table 13 in which the graphic data, the attribute information or the like is stored, and registers therein a figure discriminator D for indicating the features of the graphic data, the attribute information or the like. The substitution discriminators A are registered for the respective memory subspaces at X(I,J,K) corresponding to the individual cells (I,J). Therefore, when the substitution discriminator A registered in the K-th memory subspace at X(I,J,K) is used in association with, for example, the K-th memory subspace at X(I+1, J,K) within a memory space X(I+1,J) corresponding to another cell, the head address of the memory subspace X(I+1, J, K) for the substitutional storage can be computed on the basis of the substitution discriminator A and the array number K. Thus, high speed data search becomes possible. Each substitution discriminator A consists of, for example, 8 bits of code, shown in FIG. 1(f) and (g) which are arrayed for the eight cells 2-9 adjoining the pertinent cell 1 of FIG. 1(e).

Figure 1F:
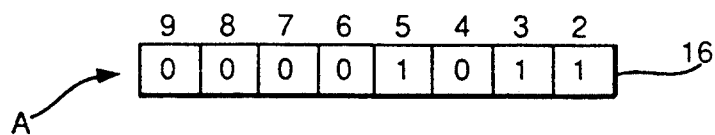

Accordingly, the cell substitution discriminator numbers 16 and 17 have bit locations in the bit table of FIGS. 1(f) and (g) respectively set in correspondence with the positional relations of the eight cells 2-9 relative to the pertinent cell 1 in FIG. 1(e). This substitution discriminator sets of flag of "1" to indicate the substitutional storage. When the bit is "0", it indicates that the memory space of the corresponding adjacent cell is presently unused and capable of the substitutional storage.

In the storing operation when the subspace of the pertinent cell is full, the bit value of "0" is sought in the train of bits of the substitution discriminator A in the memory subspace of the adjacent cell corresponding to the found "0" bit of the array number K corresponding to the pertinent cell. When the substitutional memory subspace of an adjacent cell has an empty area as indicated by a "0" in the bit map A, the address data is substitutionally stored therein and the flag of "1" is set at the corresponding bit of the substitution discriminator A. When the substitutable memory subspace has no empty area, the flag is left intact at "0", and the next prospective memory subspace with a flat of "0" is examined for the pertinent cell.

On the other hand, in the read searching operation, only the substitutable memory subspace in which the flat of "1" is set is selected from among the train of bits of the substitution discriminator A, and the head address thereof is found on the basis of the values I,J and K.

The inclusion-exclusion discriminator B in FIG. 1(a) sets "0" as an initial value, and "1" is set when the address data of another cell (other than the pertinent cell) has been stored in a subspace of the pertinent cell where information is being read or written. Thus, in reading out the address data which concerns the pertinent cell (I,J), only the memory subspace whose value B is set to "0" is selected to be read, whereby the confusion of the address data of the pertinent cell with that of another cell can be avoided.

Although the example 15 of FIG. 1(e) has eight adjoining cells (2,3,4,5,6,7,8,9) set as the substitutable memory spaces for the referenced pertinent cell (1), the substitutable memory spaces are not restricted to the eight adjoining cells. Bit tables 16 and 17 of FIGS. 1(f) and (g)are two examples of substitution discriminators A respectively registered in the memory subspaces 112 and 113 corresponding to the pertinent cell (I,J) (cell of FIG. 1(e). In FIG. 1(f) the substitution discriminator A of the memory subspace 112 at X(I,J, 1) of array number K=1 indicates that the cells at a relative position 2 of the cell (I+1,J), at a relative position 3 of FIG. 1(e) (cell (I+1, J+1)) and a relative position 5 of FIG. 1(e) (cell (I−1, J+1)) have the substitutable memory subspaces, wherein the bits corresponding to relative position cells 2,3, 5 are set with "1" and the bits corresponding to relative position cells 4,6,7,8,9 are not set, that is they are "0". The substitution discriminator A shown in the bit table 17 of FIG. 1(g) of the memory subspace 113 at X(I,J,2) of array number K=2 has only a bit for the adjacent cell at a relative position 4 (cell (I,J+1) set with "1" to indicate the substitutable memory subspace.

As stated for the first embodiment, the substitution discriminators A are registered for the respective arrays K within the memory space at X(I,J) in correspondence with each cell (I,J) and they are collectively registered in part of the memory space at X(I,J) corresponding to each cell (I,J). Further, the substitution discriminators A are registered in common in correspondence with the cell without distinguishing them in accordance with the array K in the second embodiment, shown in FIG. 2. In an address data table of FIG. 2(a), a memory space at X(I,J) includes two memory spaces 201, 202 and a memory space 203 for storing the substitution discriminator A in correspondence with each cell (I,J). The head address of this memory space at X(I,J) is computed using the values I,J. An owner discriminator E is checked with a substituted memory space in the data-read searching operation and is in each of the inclusion-exclusion discriminators B described before.

An example of the owner discriminator E in FIG. 2(a) is such that, when the address data C is associative with the pertinent cell itself, "1" is registered at the owner discriminator E. When the address data C is associative with the substitutive cell, a train of bits indicating the owner is registered as the owner discriminator E, using the discrimination numbers 15 in FIG. 1(e) as stated before. In searching for address data, the address data of the substituted memory spaces can be properly searched for by finding the correspondence between the cell discrimination number indicated by the substitution discriminator in the memory subspace 203 within the memory space associated with the pertinent cell and the cell discrimination number indicated by the owner discriminator E registered for each of the arrays within the substitution memory subspaces.

As an example with reference to FIG. 2, address space ADPz$^{j+1}$ cannot be stored in the memory space X(I,J) for the cell (I,J) because of the lack of room and therefore is substitutionally stored in the right adjacent cell (I+1, J), which is cell 2 in FIG. 1(e). Cell discrimination numbers 21 of FIG. 2(b) are centering around the cell (I,J), while cell discrimination numbers 22 are centering around the right adjacent cell (I+1, J). When the cell (I,J) is the pertinent cell, the right adjacent cell (I+1, J) is indicated by owner discrimination number "2". Therefore, the bit train of the substitution discriminator A in subspace 203 in the memory space at X(I,J) for the cell (I,J) has "1" set in the bit position of the discrimination number "2". Simultaneously, the owner discriminator E of the memory space at X(I+1, J) for the cell (I+1, J) stores therein discrimination number "6", which indicates that the address data stored here is of the left adjacent cell (I,J).

In this embodiment, the eight cells adjoining the pertinent cell at the center are held in correspondence with the cell discrimination numbers as indicated at 21 and 22 in FIG. 2(b). Therefore, when the discrimination number indicated by the substitution discriminator A is 5 or less, a value obtained by adding 4 thereto becomes the discrimination number indicated by the owner discriminator E, which is registered in correspondence with the array K within the memory space of the substitutional cell, and when the former discrimination number is 6 or greater, a value obtained by subtracting 4 therefrom becomes the latter discrimination number. Using the discrimination number, the address data substantially stored in the memory spaces of the other cells can be searched for. In a case where the address data C is not registered yet, initial values of "0" are set as the substitution discriminator A and the owner discriminator E, and the process of referring to the address data in the searching operation is omitted.

The searching and storing will now be described in conjunction with Embodiment 1.

Referring back to FIG. 1(a), an example of the figure discriminator D will be explained. "1" denotes an end point, "2" a node point, "3" a point on a line, "4" a point constituting a plane, and "5" a point typical of attribute information. By way of example, in a case where the end point and node point of a figure are to be stored as graphic data, the address data C indicates a memory position on the graphic data table 12, FIG. 1(b), storing the coordinates of the prospective points and the figure discriminator D indicates either the end point "1" or the node point "2" are stored in the subdivided memory space within the address data table 11 of FIG. 1(c). In a case where the point on the line is to be stored conjointly as graphic data, the address data C, which indicates the head address of the memory space of the graphic data table 12 of FIG. 1(b) storing the coordinates of the start point or end point on the line, and the figure discriminator D which indicates the point "3" on the line, are stored in the subdivided memory space within the address data table 11. In a case where also the attribute information is to be stored, the address data C which indicates the head address of the corresponding memory space of the attribute data table 13 of FIG. 1(d) storing the coordinates of the attribute information, and the figure discriminator D which indicates the attribute information "5", are stored in the subdivided memory space within the address data table 11 of FIG. 1(c).

Further, all figures can be searched in such a way that the head addresses of those memory spaces of the graphic data table 12 which store therein the values Nm indicative of the numbers of points constituting the figures (for example, the head address of the memory spaces 121 of the graphic data table 12 in FIG. 1(b), are additionally registered in the memory subspaces within the address data table 11 of FIG. 1(c).

Next, the operation of the whole construction will be described. By way of example, it is assumed that a linear figure L1, a linear figure L2, and a linear figure L3 and the attribute information Am are drawn within the co-ordinate space numbered 10 which covers the figures. The drawing is read by a drawing input apparatus 308 to be described later. Then, the X- and Y-coordinates, on the drawing, of each of the end points and node points of the respective linear figures L1, L2, and L3 are stored as graphic data in the graphic data table 12 together with the numbers of constituent points Nm of these figures. The X- and Y-coordinates on the drawing, of the attribute information Am are similarly stored as attribute information data in the attribute table 13 together with the content Cm of this attribute information.

The graphic data table 12 of FIG. 1(b) stores therein the coordinates (X,Y) of the points P constituting the figures and the numbers N of the constituent points. The quantity N1 stored in the space 121 within a space Y(L1) on the graphic data table 12 denotes the number of polygonal lines on the linear figure L1. Space 122 stores the X-coordinate value of the first point P11 of the linear figure L1, while space 123 stores the Y-coordinate value of the first point P11 of the linear figure L1. The X-coordinate value and Y-coordinate value of the i-th point of the linear figures L1 are respectively stored in space 124 and space 125, and as to all the end points and node points of the linear figure L1, the X- and Y-coordinates thereof are stored in the space Y(L1).

Likewise, as to the linear figures L2 and L3, the numbers of the polygonal lines thereof and the X- and Y-coordinates of the end points and node points thereof are stored in respective spaces Y(L2) and Y(L3).

The address data table 11 stores for each cell the substitution discriminator A, the inclusion-exclusion discriminator B, the head address C of the corresponding space memory within the graphic data table 12, and the figure discriminator D indicating the feature of the figure. X(I,J) denotes that memory space within the address data table 11 which corresponds to the cell (I,J) within the coordinate space 10 covering the figures L1, L2, L3. The size (memory capacity) of this memory space X(I,J) is fixed and it is subdivided by three arrays K. In this manner, the size of the individual memory space 111 of FIG. 1(c) corresponding to each cell 14 of FIG. 1(a) is fixed. Therefore, when the head addresses of the respective memory spaces on the address data table 11 are obtained from the cell number I,J, the head addresses of the memory spaces X(I,J,K), subdivided using the array numbers K, are also determined in succession. Each of the memory subspaces at X(I,J,K) store therein data on the line in the cell (I,J) of information indicative of the substitutional memory address thereof. As described before, each memory subspace is partitioned into the substitution discrimination A which indicates that the address data is substitutionally stored in the substitutional memory space nearby, the inclusion-exclusion discriminator B which serves to distinguish whether the stored data is of the pertinent cell itself or the other cell, the space C in which the address data is registered, and the figure discriminator D which indicates the feature of the figure.

Figure 1G:
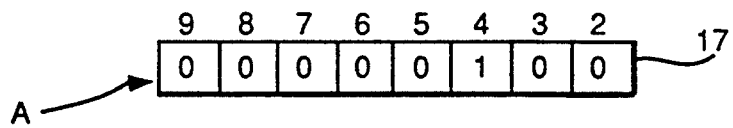

By way of Example, a line 11 of FIG. 1(a) constituting a part of the linear figure L1 passes in the cell (I,J). Therefore, spaces 112, 113 at the head address X(I,J) of the address data table 11 point to the graphic data table 12 that stores therein the X- and Y-coordinates of the start point and end point of the line 11 respectively. Also, there are stored the values of the figure discriminators D expressing the features of the figure, and the values "0" of the inclusion-exclusion discriminators B indicating that the stored address data belongs to the pertinent cell itself. More concretely, the memory subspace 112 stores therein the address data AD $P_1^{i+1}$ indicating the head address of that space 126 within the graphic data table 12 in which the coordinates of the (i+1)th point $P_1^{i+1}$ of the linear figure L1 are stored, the value "1" of the figure discriminator D indicating that the point concerned is the end point, and the value "0" of the inclusion-exclusion discriminator B indicating that the stored address data is of the pertinent cell itself. The subspace 113 stores therein the address data $ADP_1^i$ indicating the head address of the space 127 within the graphic data table 12 in which the coordinates of the i-th point $P_1^I$ of the linear figure L1 are stored, the value "3" of the figure discriminator D indicating that the point concerned is a point on the line, and the value "0" of the inclusion-exclusion discriminator B indicating that the stored address data is of the pertinent cell itself. Memory subspace 114 within the memory spaces X(I+1, J) for the right adjacent cell (I+1, J) stores therein the address data $ADP_2^{J+1}$ indicating the head address of that space 128 within the graphic data table 12 in which the coordinates of the (J+1)th point $P_2^{J+1}$ of the linear figure L2 are stored, the value "2" of the figure discriminator D indicating that the point concerned is a node point, and the value "1" of the inclusion-exclusion discriminator B indicating that the stored address data is of another cell. The substitution discriminator A, 16 of FIG. 1(f), is in the memory subspace 112 of the array 1 within the memory space at X(I,J), and the bit corresponding to the discrimination number "2" is set to "1" in order to indicate that the address data concerning the figure of the cell (I,J) is substitutionally stored in the memory subspace 114 of the array 1 within the memory space at X(I+1, J) for the cell (I+1, J) adjoining at the right as viewed from the pertinent cell and corresponding to the array number "2". Likewise, the address data items concerning the figures of the cell (I,J) are substitutionally stored on a memory subspace 115 within a memory space at X(I+1, J+1) and a memory subspace 116 within a memory space at X(I−1, J+1), so that the substitution discriminator A, 16 of FIG. 1(f) has value "1" stored at the corresponding discrimination numbers "3" and "5". In FIG. 1(g) the substitution discriminator A,17, is registered in the memory subspace 113 of the array 2 within the memory space at X(I,J), and the bit corresponding to the discrimination number "4" is set to "1" to indicate that the address data concerning the figure of the cell (I,J) is substitutionally stored in a memory subspace 117 of the array 2 within a memory space at X(I,J+1) for a cell (I,J+1) overlying the pertinent cell and corresponding to the array number "4".

As described above, the address data items which indicate that memory addresses of the graphic data on the figures passing in the cell (I,J) are first stored in the subspaces 112 and 113 within the memory space corresponding to the pertinent cell, and when these subspaces have become full, the remaining address data items are substitutionally stored in the subspaces 114, 115, 117 and 116 within the memory spaces corresponding to the other cells in succession.

Figure 3:
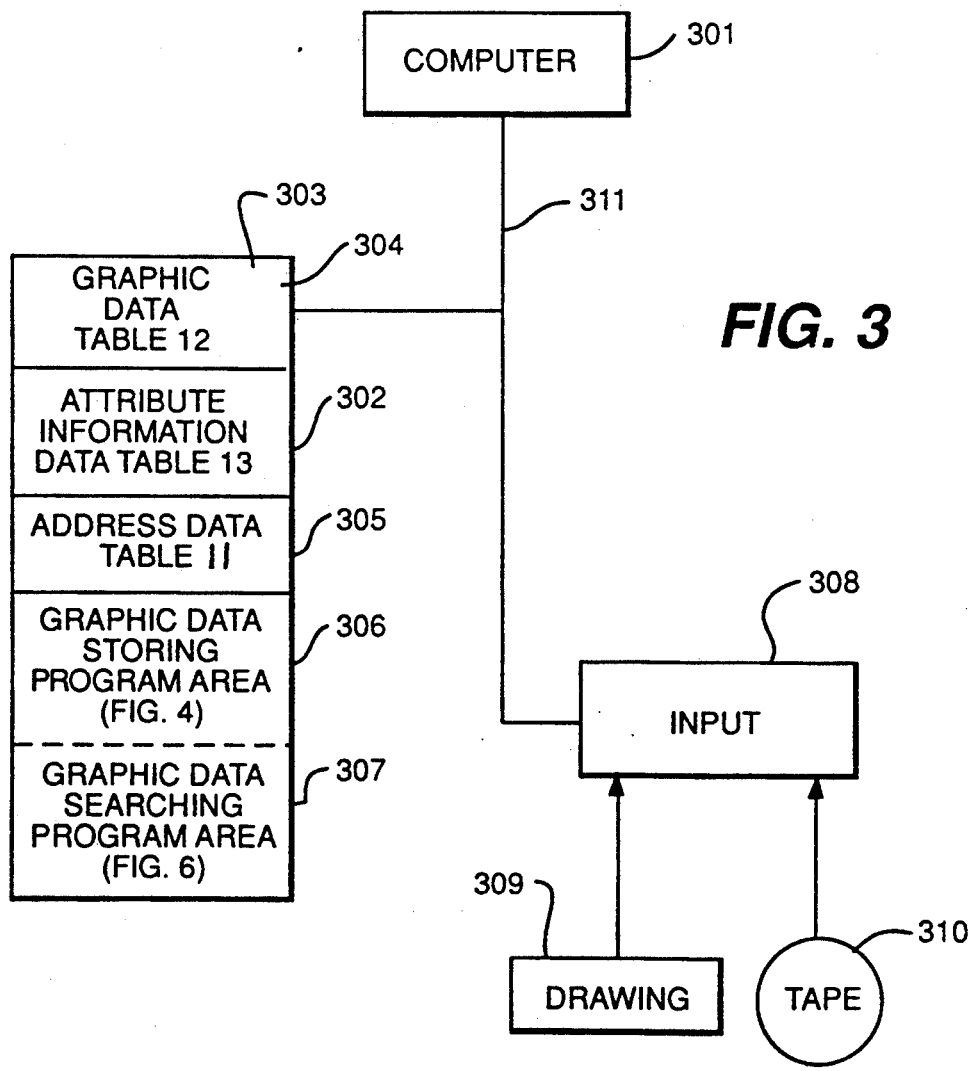
FIG. 3 is a diagram showing a hardware architecture.

The whole system for performing the method is shown in FIG. 3. The data input apparatus 308 and a memory 303 are connected to a computer 301, including a CPU through a data bus 311. The memory 303 includes the area 304 of the graphic data table 12 for storing graphic data, the area 302 of the attribute data table 13, the area 305 of the address data table 11 for registering the memory addresses of the graphic data, the area 306 of a graphic data storing program, and the area 307 of a graphic data searching program. It is also possible to realize the respective programs in hardware fashion.

Figure 4A:
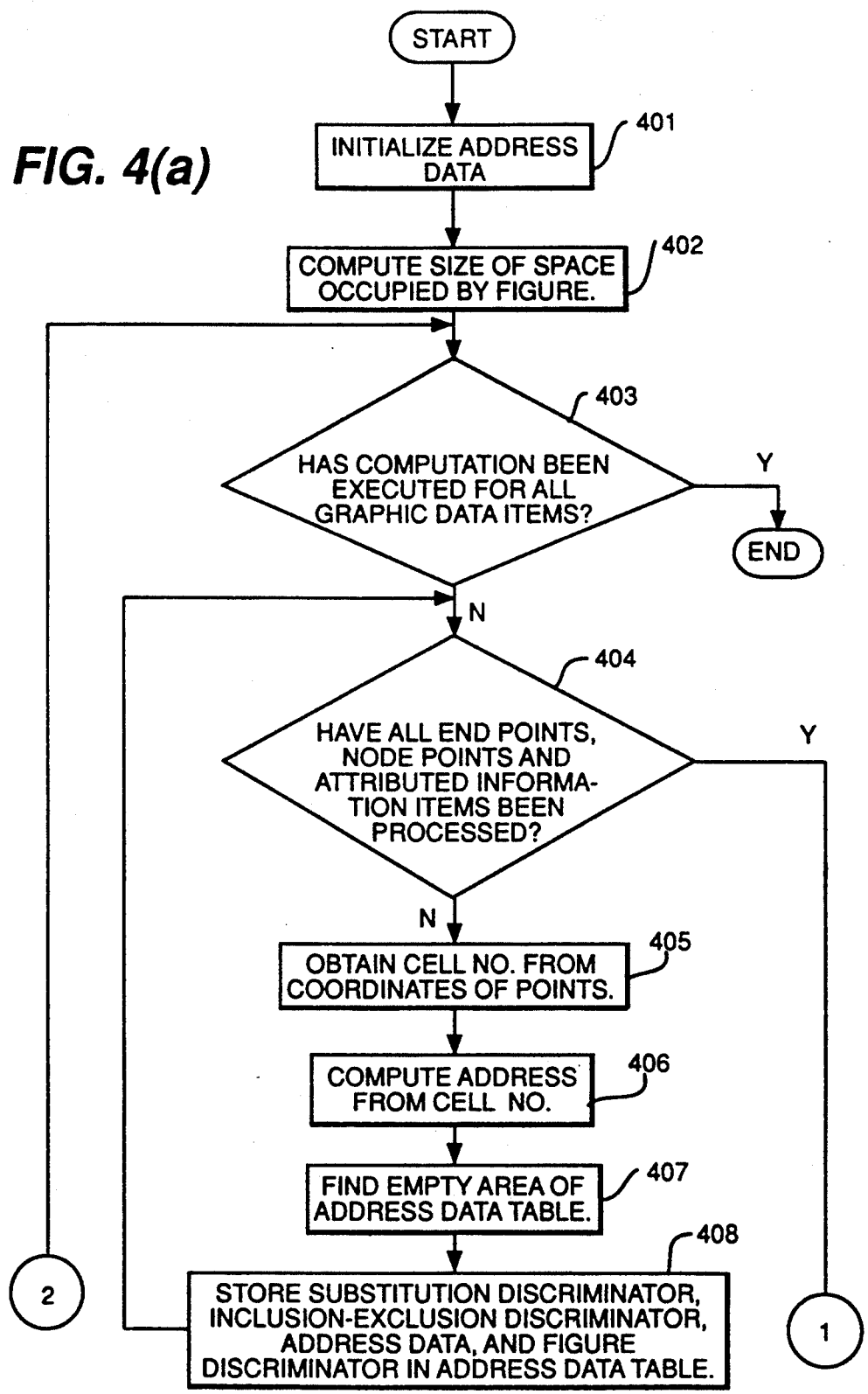
FIGS. 4 (*a*) and (*b*) show a flowchart showing graphic data storing program.
Figure 4B:
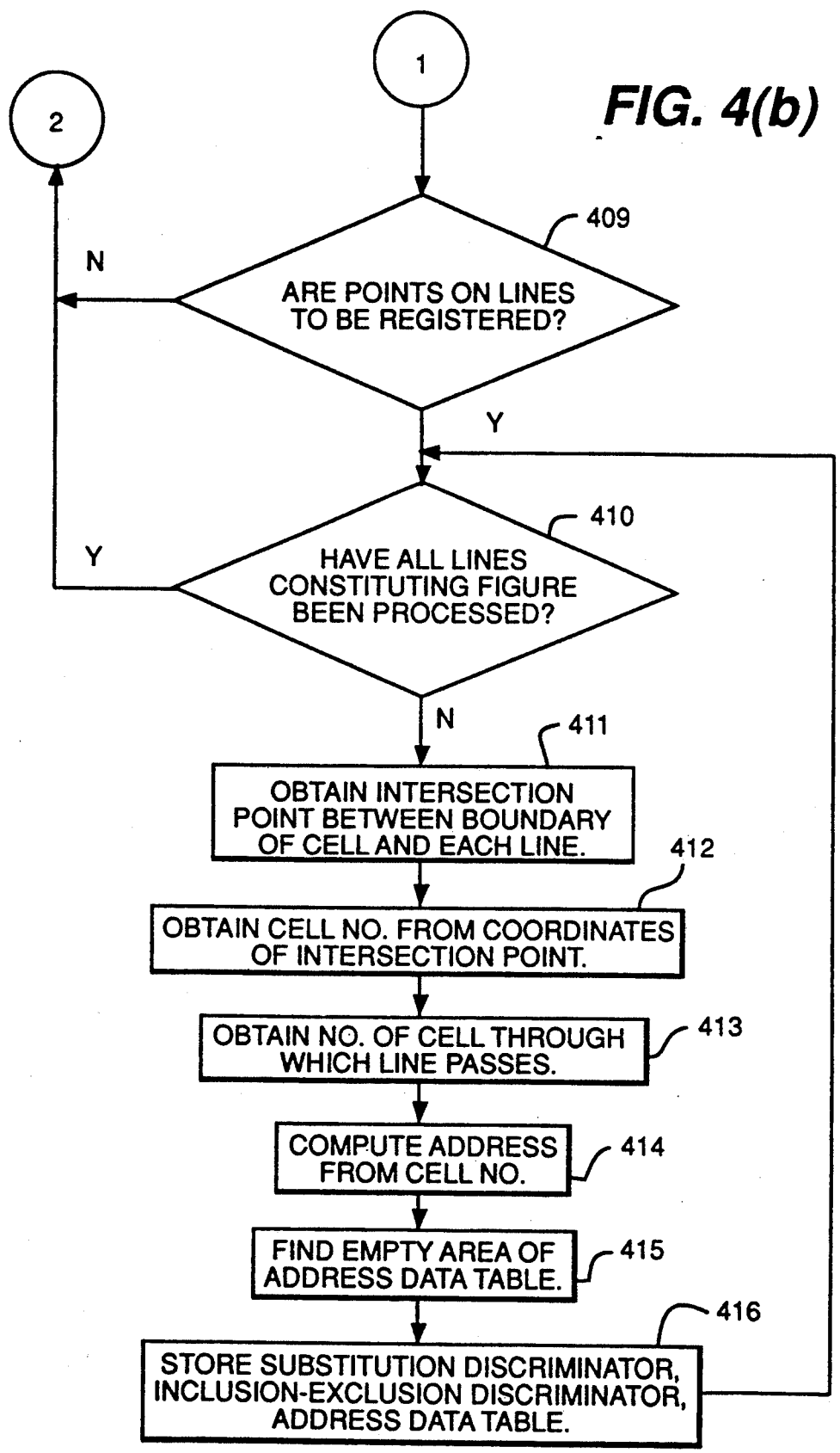

A drawing 309 to be processed is read as graphic data items by the graphic data input unit 308 in accordance with the graphic data storing program of FIG. 4 within the memory area 306, which program is executed by the computer 301. The read graphic data items are stored in the graphic data table 12 within the memory area 304 and the attribute date table 13 within the memory area 302. Further, as stated above, address data items indicating the memory addresses of the graphic data table 12 which store the graphic data items of respective figures therein are stored in the address data table 11 within the memory area 305. As stated before, the graphic data items are items of the coordinates of the end points and node points of polygonal lines. Attribute data items are data indicating the presence of a special library figure, for example, and data identifying the same for retrieval. The graphic data input apparatus 308 is constructed of e.g. a manual drawing input apparatus with which the graphic data items are manually converted into the coordinate data items, for example a digitizing drafting table, or an automatic drawing input apparatus which reads the coordinate data items automatically, for example a scanner. A magnetic tape apparatus 310 can also input figures generated by another system.

Figure 6:
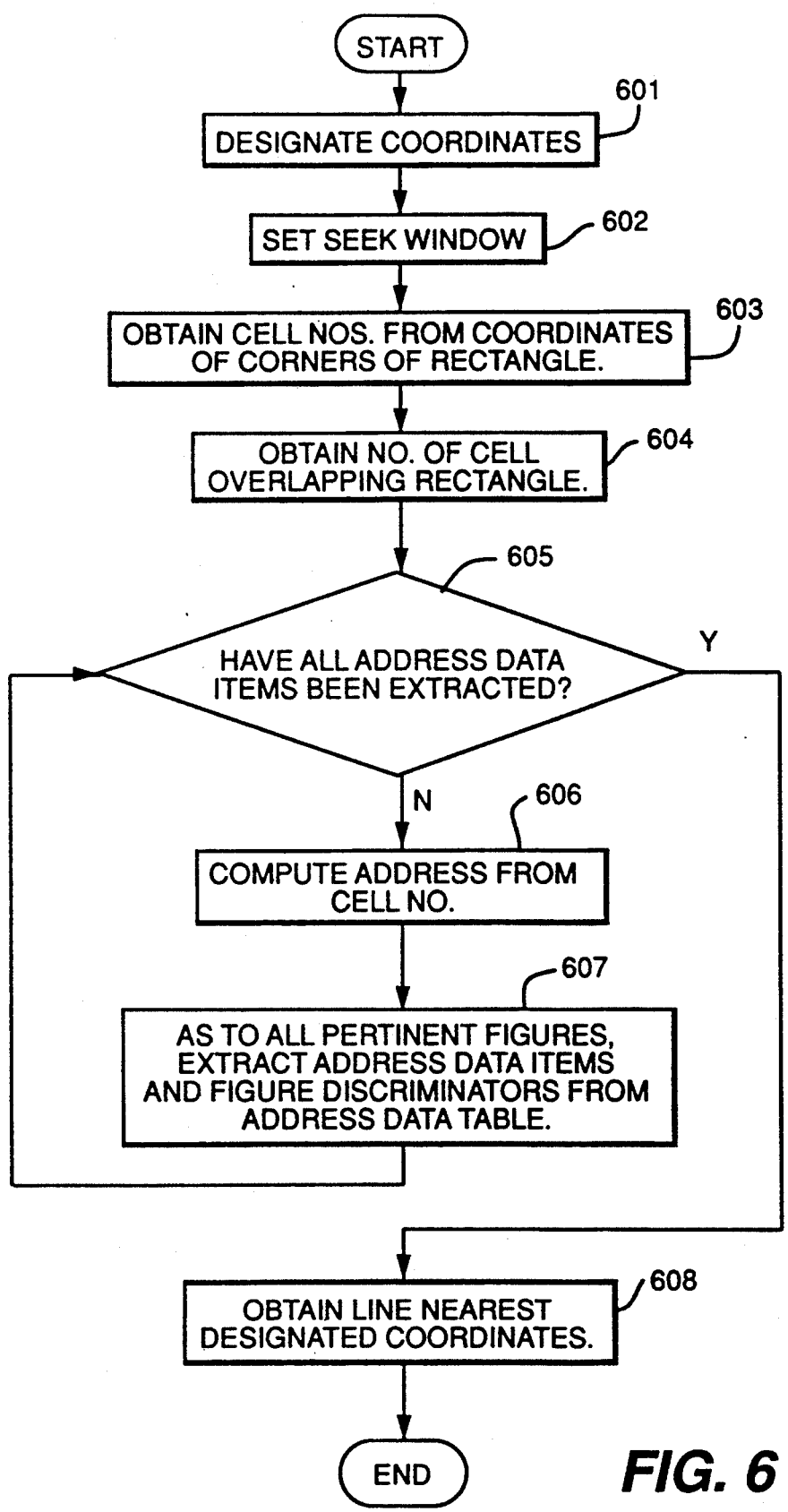
FIG. 6 is a flow chart showing a graphic data searching program.

In case of searching the graphic data, the computer 301 executes the graphic data searching program of FIG. 6 within the memory area 307, and the graphic data items stored in the graphic data table 12 of the memory area are fetched with reference to the address data table 11 of the area 305.

The address data table 11 is generated according to the process shown in FIG. 4. First, the entire memory space of the address table 11 is initialized. By way of example, values "0" are substituted for data at each memory location (step 401).

Subsequently, with respect to the input figure of a drawing, coordinate values in the respective directions X and Y are compared by referring to all of the graphic data items, to find the maximum values and the minimum values, the difference of which are used for obtaining an X-directional length FX and a Y-directional length FY as the overall size of the space required by the figure represented by the graphic data (step 402). The answers to the determinations of steps 403 and 404 are no, since there remain data to process. Thereafter, the address data items C indicating those memory addresses of the graphic data table 12 in which the coordinates of the end points and node points of the respective figures of the graphic data are stored, and the substitution discriminators A, the inclusion-exclusion discriminators B or the owner discriminators E, and the figure discriminators D are registered in the memory spaces of the address data table 11 with reference to the coordinate values for the end points and node points of the figures. First, the coordinates (X,Y) are transformed into the numbers I,J of the cells containing these coordinates, by the following coordinate transformation formulae (step 405):

$$I = [X \times AX/FX]$$

$$J = [Y \times AY/FY]$$

Here, FX and FY denote the X- and Y-directional lengths of the coordinate space where the figures exist, respectively. AX and AY denote the numbers of division of the coordinate space in the X- and Y-directions, respectively. [] is the Gauss symbol, which signifies to take the greatest integer not exceeding a number written therein.

Next, the memory address of the graphic data stored in the graphic data table 12 is registered in the memory space at X(I,J) corresponding to the cell number I,J within the address data table 11. The capacity of the memory space at X(I,J) corresponding to the cell (I,J) is fixed. Since the arrays within the memory space at X(I,J) corresponding to the cell (I,J) are considered as X(I,J,K), the head address ADR of the memory space X(I,J) can be computed (step 406) from:

$$ADR = AY \times DP \times N - B \times I + NB \times DP \times J + NB \times (K-1) + FST\$AD$$

Here, DP denotes the number of those memory addresses of the graphic data which can be stored in the memory space at X(I,J) corresponding to the cell (I,J), NB denotes the capacity of the memory space which stores therein the substitution discriminator A, the inclusion-exclusion discriminator B, the address data C and the figure discriminator D as to one memory address of the graphic data, and the symbol FST$AD denotes the first address of the address data table 11. Assuming:

$$AY = 2^m, DP = 2^n \text{ and } NB = 2^l$$

then Eq. (2) can be rewritten as:

$$ADR = I \times 2^{m+n+l} + J \times 2^{n+l} + (k-1) \times 2^l + FST\$AD$$

Since the powers of 2 can be computed by shift calculations, they are suited to computer processing.

The head address on the address data table area 305 is computed in accordance with Eq. (2) (step 406).

In a case where data has already been registered in the space of X(I,J,K), empty areas are sought while the array K within the corresponding memory space at X(I,J) is being updated as (I,J,K+1) and (I,J,K+2). When there is no empty area found, substitutable memory spaces are sought on the basis of the substitution discriminator A as described before, and the memory space capable of storing the discriminators etc. is selected (steps 407). The initial value "0" is held in the empty memory space.

The substitution discriminator A, inclusion-exclusion discriminator B, the address data C and figure discriminator D are stored in the particular memory space (step 408). The above processing is repeated for each of the end points, node points and attribute information by processing from step 408 to step 404 until step 404 indicates that all end points, node points and attribute information items have been processed so that the process proceeds to step 409.

Further, in step 409 it is determined if there are points on lines different from the end points, node points and attribute information to be registered in the address data table 11. If the answer to step 409 is yes then the answer to step 410 is no and then the intersection point between the boundary of a cell and each of the lines constituting a figure is obtained in step 411. Since two boundaries in the vertical direction and in the horizontal direction can be selected as the boundary of the cell, one of them is selected by the following method: First, a circumscribed rectangle having parallel latera in the X-direction and Y-direction is set with its diagonal line being the line within the cell, and the X-directional and Y-directional lengths thereof are respectively denoted by Dx and Dy. Herein if $Dx \geq DY$ holds, then the cell boundary in the horizontal direction is selected. Then the number (I,J) of the cell including the intersection point between the line and the cell boundary is obtained using Eq. (1) (step 412).

Regarding the end point of the line and the intersection point of the line with the cell boundary, the middle points between them and all adjacent points are found. Subsequently, the numbers of cells including the middle points are obtained in accordance with Eq. 1 (step 412). Here, in a case where the line, the boundary of the cell in the vertical direction, and boundary of the cell in the horizontal direction intersect at one point, the numbers of four cells surrounding the point of the intersection are obtained in order to regard the four cells as the cells in which the line passes. Since the numbers of two of the four cells have already been found, the numbers of the other two cells are readily obtained from the relation of adjacency of the cells. These cell numbers are added to the cell numbers obtained at step 412, whereby the numbers of all the cells in which the line passes are obtained (step 413). The cell numbers thus obtained are substituted into Eq. (2) to calculate the head addresses of the address data table 11 (step 414), and the empty areas of the address data table 11 are sought to select a storable memory space (step 415). The substitution discriminator A, the inclusion-exclusion discriminator B, the address data C, and the figure discriminator D indicating the points on the line are stored in the selected memory space (step 416). With this method, the data items are stored in the memory spaces of the address data table 11 corresponding to all the cells in which the line passes.

The above processing is repeated by passing from step 416 to step 410 for all lines constituting the figure. When all lines have been processed by steps 411–416, flow returns to step 403, according to decision step 410.

The operations of storing the substitution discriminators A, inclusion-exclusion discriminators B, address data items C, and figure discriminators D in the address data table 11 are executed as to all graphic data items and attribute information items (step 403). An address data table concerned with only specified information can be generated in such a way that step 403 is additionally endowed with the function of deciding the colors and sizes of figures, or selectively storing only specified prospective data items as only the end points of graphic data, only the end points and node points of graphic data, only points on planes or only associated attribute information items. Besides, the supplementation or deletion of figures can be coped with by the above processing. In the case of deleting figures, however, the substitution discriminators A, inclusion-exclusion discriminators B, address data items C and figure discriminators D are deleted instead of being stored on the memory. It is to be understood that, in the two cases of the supplementation and the deletion, the whole address data table need not be renewed.

As an example of graphic processing in which the address data table is actually employed, T-shaped connection processing as shown in FIGS. 5(a) and (b) will be explained. This processing is one in which the closest line L from an end point P that lies within a designated extend is selected (a line containing the point P is excluded), whereupon the point P is drawn onto the line L. In this processing, the address data table is initially generated as to end point, node points and points on lines. Subsequently the data searching program memory area 307 of the memory 303 in FIG. 3 is executed.

The graphic data searching program is shown in FIG. 6. First, the coordinates of point P are designated (step 601), and a rectangular seek window is set around the point P (step 602). The coordinates of the left lower corner and right upper corner of the seek window are converted to cell numbers in accordance with Eq. (1) (step 603). The number of a cell lying inside the seek window is evaluated with reference to the number of a cell found at the step 603 (step 604) and the address of the address data table corresponding to the evaluated cell number is obtained using Eq. (2) (step 606). The array is updated on the basis of the designated address, and as to all corresponding figures, the address data items C and the figure discriminators D are extracted by reference to the substitution discriminators A (step 607). The processing to the steps 606 and 607 is executed for all the cells lying inside the seek window (step 605). From among lines which exist within the coordinate space which covers all such cells, lines which exist in the cells near the pertinent cell as specified by the figure discriminators D and that have the corresponding address are selected on the basis of the addresses and figure discriminators D in the extracted data items, the distances between the group of selected lines and the point P are mathematically evaluated from the respective coordinates thereof and are compared, and the nearest line is selected (step 608). Finally, the intersection point Q between the nearest line and the line containing the point P is obtained, and the coordinates of the point P are changed into those of the point Q.

Further, the method can be applied to the construction of an address data table concerning three-dimensional figures by increasing the dimensions DP of the array (I,J,K).

Next, referring to FIGS. 7(a) through (e), there will be described methods of storing address data in the case where the number of graphic data items is excessively large relative to a fixed memory capacity prepared beforehand and empty memory areas (substitutable memory spaces) nearby, so all of the address data etc. of the graphic data (including also relevant information etc. for substitutional storage) cannot be stored. FIG. 7(a) shows figures which pass in a cell (I,J). A linear figure Ln and a linear figure Lm pass in the cell (I,J). Symbol $P_n^j$ denotes the j-th point (a point on a line) on the linear figure Ln, symbol $P_n^{j+1}$ denotes the (j+1)th point (a node point) on the linear figure Ln, symbol $P_m^i$ denotes the i-th point (a point on a line) on the linear figure Lm, and symbol $P_m^{i+1}$ denotes the (i+1)th point (a node point) on the linear figure Lm.

Besides, a linear figure La indicated by broken lines is a linear figure added. Symbol $P_a^1$ indicates the first point (a node point) on the linear figure La.

FIG. 7(b) shows an example storing the address data etc. in an address data table 700 in the case where they cannot be stored at memory space X(I,J) for lack of room. X(I,J) denotes a memory space corresponding to the cell (I,J). Value "6" stored in partial space 71 of the memory space at X(I,J) is a discriminator which indicates overflow of address data which cannot be stored in the space at X(I,J) and which is successfully stored in another memory space 72 pointed to by the address. In another example, shown in address data table 710 in FIG. 7(c), the address and the discriminator "6" indicative of the overflow are stored on the head space 73 of the space at X(I,J), and the address data and new address data are combined and then shifted into another memory space 74 pointed to by the address. By controlling the storage in a memory in this manner, the storage of the present invention can be applied even to a cell in which graphic data items are dense. Further, as shown, an address data table 720 in FIG. 7(d), even when a figure to be added to such a cell is undergoing the overflow, the address data of the figure to be added may well be shifted into another memory space 76 together with the overflowing data. In this case, only the address stored in a space 75 may be stored. Address data stored in a space 81 are the data added. Moreover as shown in an address data table 730 in FIG. 7(e), in the case of storing the address data in another memory space at overflow, another space 78 to form a pair with the address data and pointed to by the address of space 77 is provided. When a new figure is subsequently added, still another space 80 is pointed to using an address stored in partial space 79 within the space 78. In this way, the address data of new figures can be successfully stored. Memory space of the address data table 730 in which no data is stored can be brought into correspondence with the other space 78. On this occasion, a discriminator, which indicates that no data corresponding to the memory space is stored, is stored on the space beforehand.

On maps and design drawings, there is some distance between the lines and polygons that are being described by graphics data. On maps, most lines are 2 mm or more apart from each other, except at intersections, and even the closest contour lines are usually 0.5 mm apart. Even on drawings with crowded lines, the area of lines (black area) is no more than about 20 percent of the total area. The ratio is less after lines are thinned. From those observations, it can be concluded that there will be no sudden increase in the number of overlapping graphics forms if graphics data are reduced by no more than a particular proportion.

The method, devised from these observations, is based on the principles illustrated in the example of the two-dimensional data in FIG. 8. The figure shows the relation among the original FIG. 10A and at a representations of it. Vector graphics are represented by X and Y coordinates (and Z for three dimensions) and stored in a predetermined format in the graphics data table 12. The address in memory where data for each line are stored can then be identified by a pointer.

The features of this system are as follows.

(1) Two-dimensional graphics data 12 are linked to two-dimensional data for a cell 10 of cells of a given size. Any graphics data can be linked to the cell by means of the proportional conversion of X and Y.

(2) Line segments and the features such as points where lines end can be linked to each cell. Pointer information C specifying the storage area of the data necessary for graphics retrieval are stored in cells. These cell data are set up by referring only once to the graphics data like showing of all graphics data on a graphics display. In addition, a great reduction is possible in the amount of cell data. In areas of the original with large amounts of data for lines, the numbers of cells required to describe them is small due to the compressing of the axes of the table. The reduction is in proportion to the product of the compression ratio of each axis.

(3) When cell data are compressed into a size several tenths that of the original, the graphics forms appearing in the same cell increase in number in proportion to the compression ratio and volume of data, which is a function of the complexity of the original. For the storage of such compressed information, each cell is made up of multiple blocks for storing the numerous pointers required for accessing the data representing the graphics forms.

(4) For retrieving the data information for any given point on the original, the corresponding cell can be located by using the same scale conversion as was used when establishing the cell data. Data for the graphics forms can then be retrieved quickly and directly from the pointer information stored in the cell. The number of candidates is likely to be one or a few, so the required graphics form can be readily distinguished by analyzing detailed information for each candidate. Since each cell of a table to store such pointers is composed of more than one block, the table as a whole is three dimensional. Therefore, we call it a quasi three-dimensional table.

In FIG. 8, when there is too much data in a cell for the number of blocks DP, there is overflow to the auxiliary table 12A as in the parent invention of which this is a continuation in part.

To implement this method on the basis of the above ideas, it is necessary to decide on the size of the table and blocks and to deal with the amount of data.

Figure 9:
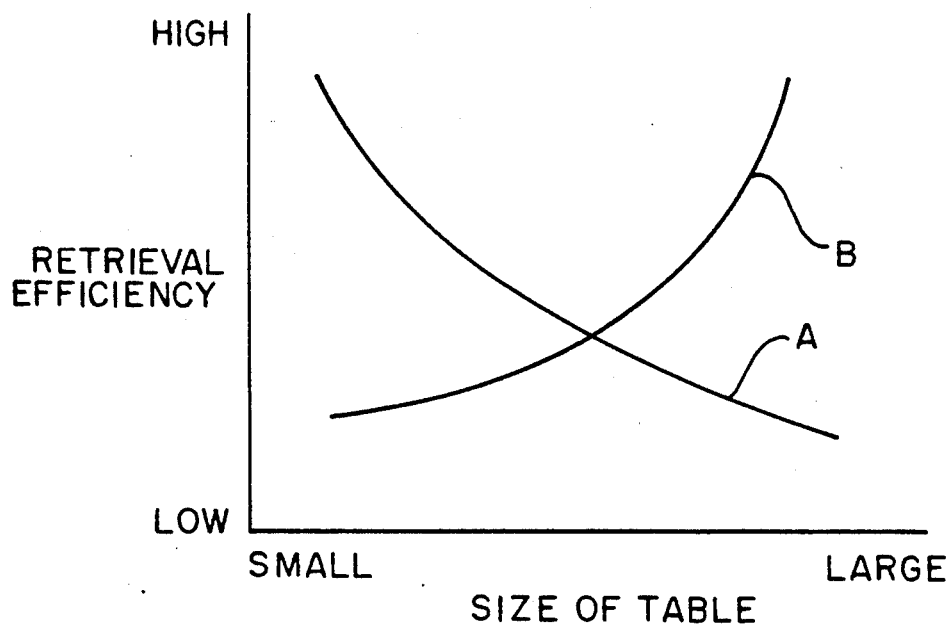
FIG. 9 is a graph concerning the address table size.

FIG. 9 shows the relation between the size of a table and the efficiency of graphics data retrieval. As the table size increases, the amount of compressed information in each cell decreases. This means that the number of detailed decisions, curve A, reduces when retrieving graphics data from pointers, adding to efficiency. On the other hand, there will be more cells to refer to in the case of retrieving graphics forms for any given point, curve B, thus impairing efficiency. Since each line segment is linked to more cells, it takes longer to create a table. As FIG. 9 suggests, there is an optimum size for a table. But the size depends upon the type of data, type of processing, configuration of processing programs, etc. We compared the speeds of basic types of graphics processing such as checking the continuity of lines of the topographical data in FIG. 10, using tables 64*64, 128*128, 256*256, and 512*512. There was a little decrease in efficiency using 64*64 in comparison with other tables, but no outstanding difference is seen among tables about that one. Aiming for better use of memory, the minimum table size that does not impair efficiency is preferable; for this example, 128*128.

If all the cells of the table are composed of the maximum number DP of blocks needed, all pointers C can be stored. But most of the blocks will be empty, resulting in reduced efficiency of memory use. Therefore, the number of blocks DP needs to be a suitable fixed number. As shown in FIG. 8, memory is set aside as an auxiliary table for the case where corresponding graphics data are too many for the specified cell to store all the pointers. This auxiliary table 12A is of variable size and is for storing any pointers that overflow the cell storage. Overflowed cells have pointers that specify the storage area used for the pointer data in the auxiliary table 12A so that the table can be referred to. Here, the reduction of the size of blocks leads to an increase in data stored in the auxiliary table. For the table, it is necessary to manipulate data with a variable number of pointers. This necessitates data movement or data packing while creating the table if the efficiency of memory use is to be maximized. The use of those processes can be minimized if some reduction of efficiency of memory use is allowed, but they cannot be avoided altogether. During retrieval, the search for pointers is performed in two steps and leads to a reduction in processing efficiency. For all the reasons above, it is necessary to optimize the size of blocks against processing speed and efficiency of memory use.

Figure 10:
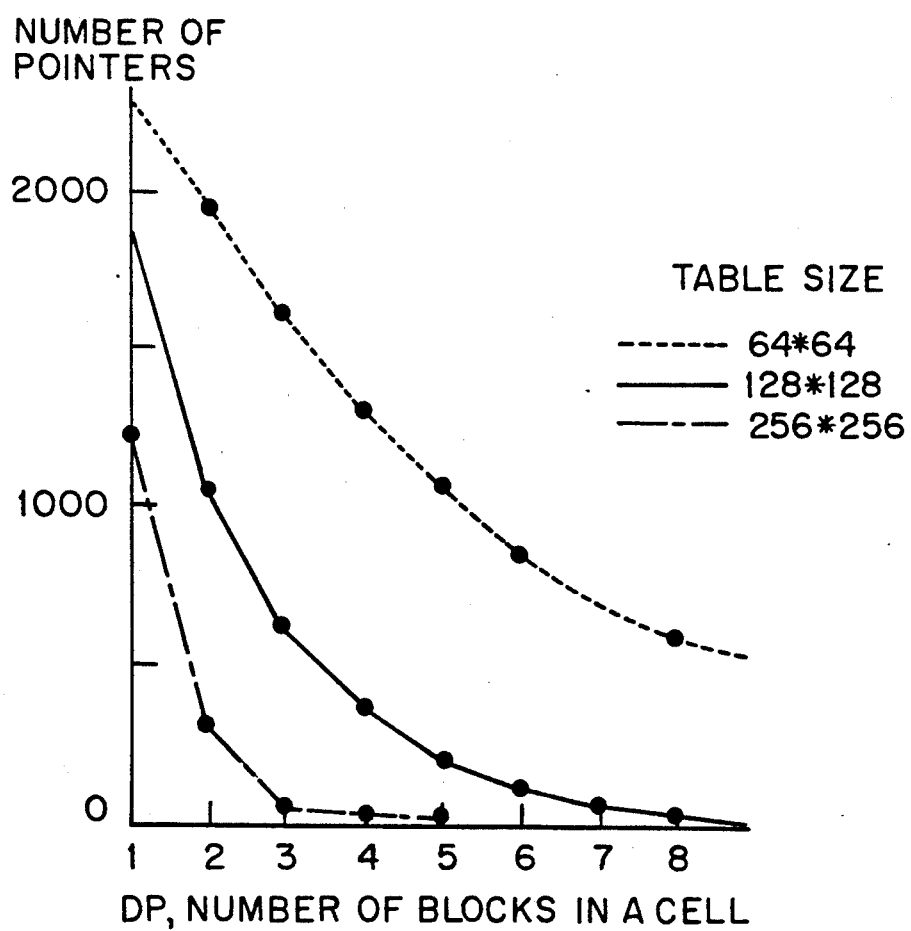
FIG. 10 is a graph concerning the cell size.

The number of pointers to be stored in an auxiliary table 12A is measured. FIG. 10 shows the change in the total number of the overflow pointers when the size of blocks is varied. It can be concluded from the measuring that a block size of 4 or 5 is preferable for a table of size 128*128. In this case, the number of pointers stored in the auxiliary table is not more than 10 percent of the total number of pointers with as little as a few percent reduction in retrieval efficiency.

When there is an alteration of graphics data, it is possible to recreate the entire table in a short time. Partial corrections, like addition and deletion, are possible in the tale because the contents are independent. When a new graphics form is entered, it is necessary to only add pointers for the figure. If a figure is deleted, the appropriate data in a cell have only to be deleted after finding the cell. If the order of registration of the original data is greatly changed, it is sometimes advisable to re-create the whole table, but usually a partial update is more efficient.

Further improvement of processing efficiency is possible by reducing the number of pointers stored in the auxiliary table; this enables avoiding additional operation. Moreover, increased efficiency of memory use is possible by reducing the number of empty blocks, according to the invention of FIGS. 1-7.

Figure 11:
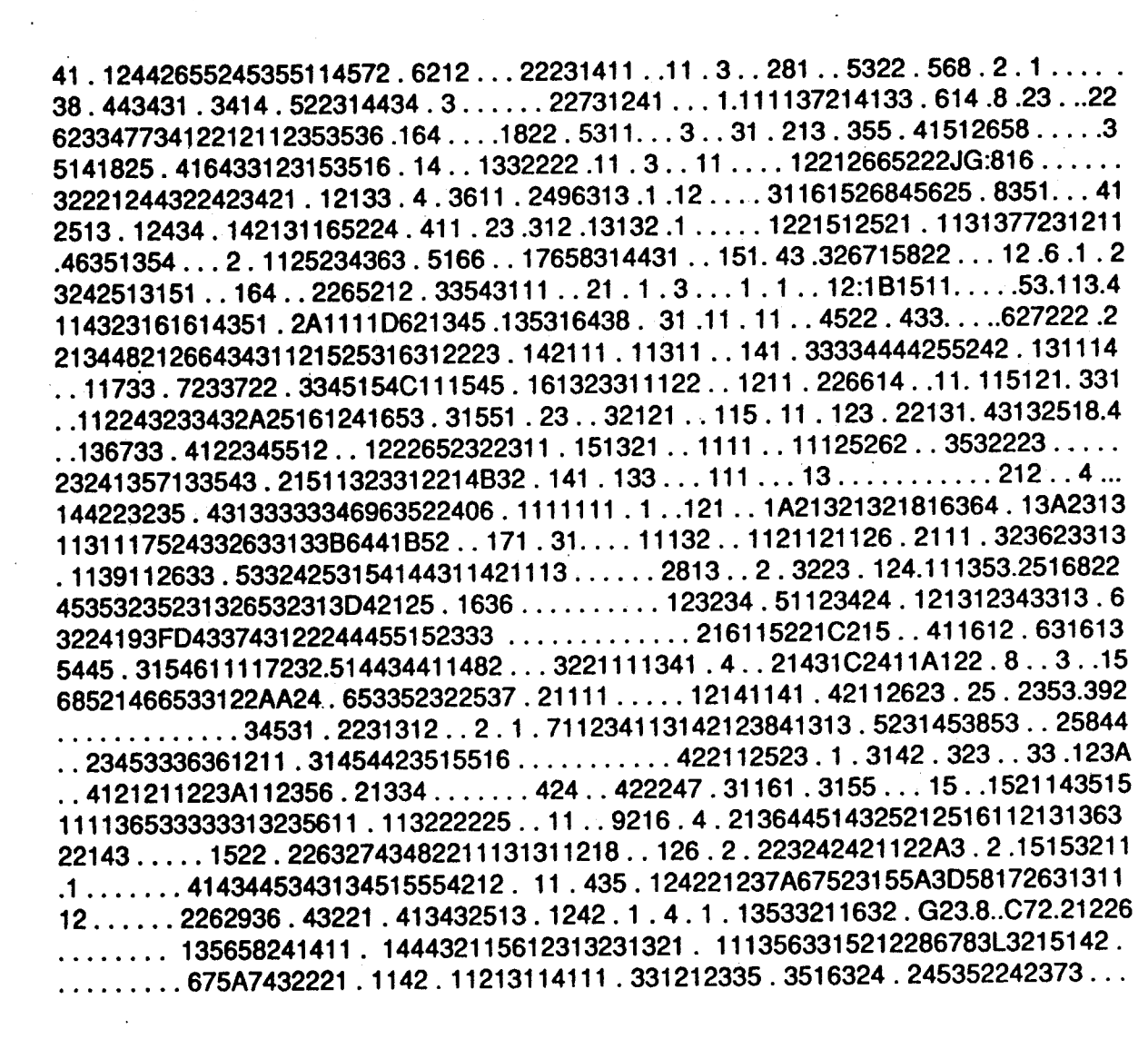

FIG. 11 shows an example of a measurement of the number of pointers to be stored. The result shows that overflowed cells are not concentrated on any particular area, and are surrounded in most cases by cells with additional capacity. Therefore, it is more effective to store pointers from overflowed cells in the surrounding cells rather than an auxiliary table.

Figure 12C:
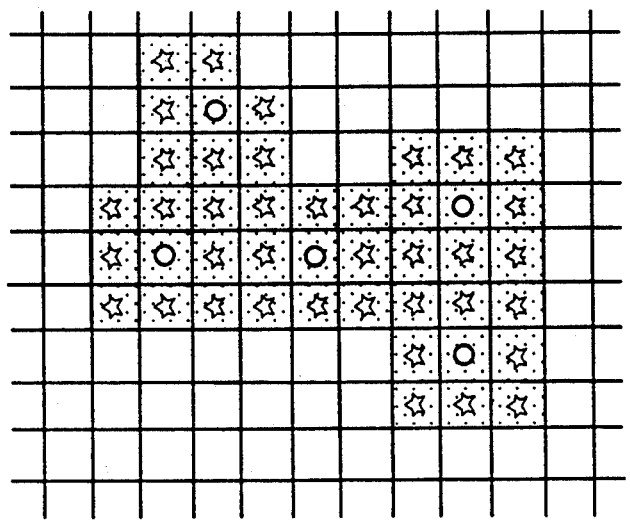
FIGS. 12 (*a*) to (*c*) are examples of figure data storage.
Figure 12A:
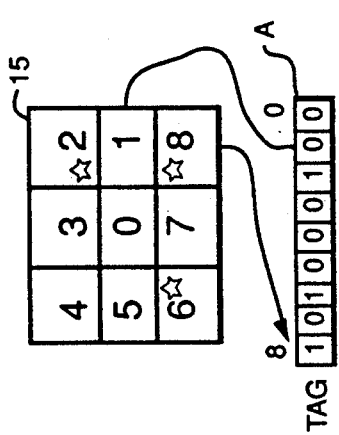

Each pointer of each cell has a tag for specifying which of the surrounding cells are sharing its data. FIG. 12(2) shows the 8 neighboring cells considered along with the pertinent cell of interest. A 9-bit tag is used to link a pointer belonging to the pertinent cell under consideration to some of the surrounding 8 cells (for storage).

The cell to which pointer should belong can be specified by assigning '1' in the tag of the pointer to the corresponding bit. Once the center cell is located by applying the reduction ratio to the coordinates in the original, surrounding cells are identified and their pointers linked with a tag of the pointer. If the cell to which the pointer should belong has overflowed, empty blocks are searched for in the surrounding cells and are used for storing the pointers, and '1' is assigned to the corresponding bit of the tag of the pointer to indicate its "correct" location. If all the surrounding cells in turn have overflowed, the pointers are placed in an auxiliary table.

This method levels the distribution of pointers to be stored. Besides the method has the effect of containing almost all the pointers in a set of 9 cells, which prevents most overflows.

If the center cell and the surrounding 8 neighbors with 4 blocks each, are considered together, a maximum of 36 pointers can be stored. Considering that the surrounding cells have their own pointers to store, about 10 blocks each will typically seem available for storing pointers, although this will depend on the type and volume of data.

Figure 12B:
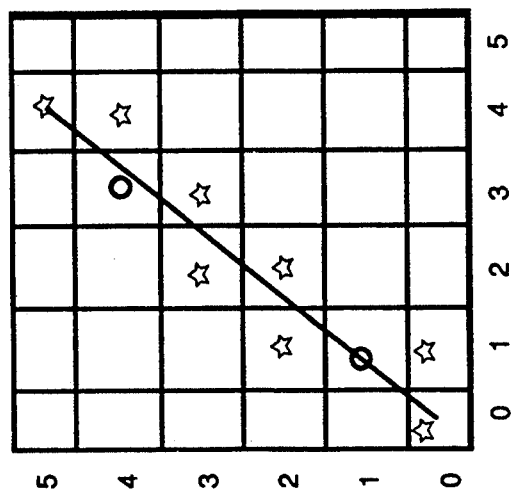

Especially in the case of storing pointers for segments of a straight line, only center cells appearing along the line at intervals are used to store a pointer with a tag identifying surrounding cells with the same pointer as shown in FIG. 12(b).

In the example shown in FIG. 12(b), the pointer is stored only in (1,1) and (4,3). The cells indicated by stars, (0.0), . . .(2,2), and (3,2), . . .(5,4), do not have pointers for the line; instead they are linked to the pointers of (1,1) and (4,3), respectively, by their tags. For straight lines this helps to reduce the number of pointers to be stored by 50 to 70 percent. The method is effective especially for pointers representing polygon information. In FIG. 12(c), it is possible to cut down the number of pointers by a maximum of 90 percent.

If the basic approach of FIG. 8 is used, with 4 blocks for each cell, it may not be possible to store all the pointers required for the data of a specific drawing, and auxiliary storage 12A would be required. However, if the extended method of FIGS. 1-7 using tags is employed, it becomes possible to store almost all the required pointers, even if each cell has only 2 blocks.

The space needed for storing one pointer is about 4 bytes after compression, though this is dependent on the type of computer and program. However, a tag covering a block of 9 neighboring cells needs 9 bits, so that in the extended method of FIGS. 1-7, 5 bytes are necessary for storing one pointer and tag. But since the block size of a table and memory for an auxiliary table are reduced, it is possible to cut down memory requirements by about 50 percent. This method also makes use of memory more efficiently, since the amount of memory for cells is reduced.

The method is effective especially for such tasks as clarifying vague or broken lines and intersections, and identifying areas. The method has been found successful in performing such work 30 to 50 times faster than conventional high-speed programs. This speed is several hundreds of times higher than programs employing only a "round robin" algorithm and no means for increasing the speed.

We applied the method (without tags) to a topographical analysis using map data. We found that when the table size was 128* 128, 80% of cells had no more than 4 pointers, so we made each cell with 4 blocks. For graphics retrieval, using a 32 bit microcomputer equivalent to a personal computer using MS-DOS, on a real time basis we achieved a processing speed more than 40 times faster than by other methods such as based on area partition. Similar results were achieved using the extended method as expected.

The present method achieved high-speed retrieval tens of times faster than conventional methods. When it was applied to various design drawings and maps, the efficiency was proved to be almost unchanged even when the size of the table was fixed, as long as there was no sudden increase in the concentration of lines, though the optimal size of the table varied slightly with the complexity of the drawing.

In general the dimension of a table is no larger than that of the original.

By this method, it is possible to analyze topographical information with a personal computer on a real time basis. Usually, such an analysis would need a long time for calculation. It is also possible to conduct topographical analysis using contour lines, to produce a bird's eye view of a DTM to retrieve large-scale attribute data at a high speed, and to analyze road and piping networks, all on a real time basis.

Since this method can be applied not only to handling attribute data such as topographical descriptions, but also to retrieving three-dimensional graphical data, it is possible to extend the method to processing three- and four-dimensional topographical information which requires manipulating vast amounts of data.

In this manner, the present invention is capable of multifarious amplifications, and the graphic data storing method is extensively feasible.

According to the present inventions, empty memory areas assigned to other cells are indirectly used, whereby an address data table can be efficiently utilized.

While a preferred embodiment has been set forth along with modifications and variations to show specific advantageous details of the present invention. Further embodiments, modifications and variations are contemplated within the broader aspects of the present invention, all set forth by the spirit and scope of the following claims.

We claim:

1. A graphic data handling method, comprising:
dividing a graphic image of figures into a plurality of graphic cells;
providing a graphic data table for storing graphic data for defining the figures within the cells;
providing an address data table which includes plurality of memory spaces of fixed capacity that are respectively assigned one-to one to the cells, for normally storing therein memory address pointers for the graphic data table, which memory address pointers respectively correspond to the figures in the cells; and
when a memory address pointer for the graphic data that corresponds to the figures in a pertinent cell cannot be stored in the memory space assigned to the pertinent cell, substitutionally storing said memory address pointer for the pertinent cell that cannot be so stored, in a memory space, as an overflow memory space, which is assigned to a different cell other than said pertinent cell.

2. The method of claim 1, including storing information indicative of the substitutional storing in the memory space of the pertinent cell of the address data table.

3. The method of claim 1, wherein said step of providing a graphic data table stores graphic data for the cells in random order independent of the position of the cells relative to the graphic image.

4. The method of claim 1, wherein said step of providing an address data table provides the memory spaces corresponding to the cells in a computer memory sequentially in a fixed order dependent upon the positions of the cells in the graphic image.

5. A method of claim 1, including retrieving graphic data from the graphic data table by:
defining an area that is only a part of the graphic image;
transposing the area into a representation of the cells within the area;
searing the memory spaces of the address data table corresponding to the cells of the area and memory spaces having substitutional storing of address pointers of the area, without searching the memory spaces corresponding to the remaining cells of the graphic image and determining address pointers therein assignable to the area; and
fetching from computer memory the graphic data in the graphic data table using only the pointers found in said searching.

6. The method of claim 2, including retrieving graphic data from the graphic data table by:
defining an area that is only a part of the graphic image;
transposing the area into a representation of the cells within the area;
searching the memory spaces of the address data table corresponding to the cells of the area and memory spaces having substitutional storing of address pointers of the area, without searching the memory spaces corresponding to the remaining cells of the graphic image and determining address pointers therein assignable to the area;
from the information indicative of the substitutional storing found in said step of searching, determining substitutional storage in other cells that contain address pointers relating to the cells of the area and retrieving the related address pointers; and
fetching from computer memory the graphic data from the graphic data table in accordance with the retrieved related address pointers.

7. The method of claim 1, including setting at least one coded number for each memory space of the addressed data table to indicate which ones of the different cells are substitutionally storing the address pointers for the pertinent cell.

8. The method of claim 1, wherein the different cells have a fixed physical location in the graphic image relative to the pertinent cell for each cell in the graphic image.

9. The method of claim 8, wherein the fixed physical location for the different cells is based on the criteria of physically directly adjacent cells in the graphic image.

10. The method of claim 1, wherein said step of providing a graphic data table stores graphic data for end points, for node points, and an intersection with the pertinent cell boundary for each line in or passing through the pertinent cell.

11. The method of claim 10, wherein said step of forming a graphic data table includes storing therein selective intermediate points and attribute information concerning the figures of the graphic image within the pertinent cell, which figures include the lines.

12. The method of claim 1, further including storing, with respect to each address pointer in the address data table, a data field indicating the type of figure of graphic data pointed to by the address pointer.

13. The method according to claim 1, wherein said step of providing an address data table includes storing a data field including a single bit for each address pointer indicating whether the address pointer is an address pointer for the pertinent cell.

14. The method according to claim 1, further including storing a plurality of bits corresponding in number to said different cells having a specific physical relationship with the pertinent cell that is the same for each cell of the graphic image, and setting the bits to indicate which ones of the memory spaces assigned to said different cells contain memory address pointers for the graphic data of the pertinent cell.

15. The method of claim 1, performed completely by a computer system having a graphic data storage program, a graphic data searching program, a memory containing the address data table, a memory containing the graphic data table, an input device for inputting the graphic image, and a data output device for outputting searching program results.

16. The method of claim 1, further including providing an attribute information data table separate from said graphic data table for indicating attributes of figures within each cell, and wherein said step of providing an address data table provides address pointers in the address data table for addresses of attribute information in the attribute information data table correlated to the cells in the same manner that the graphic data in the graphic data table is correlated to the cells, and including with each pointer in the address data table a field indicating whether the pointer relates to the graphic data table or the attribute information data table.

17. The method of claim 1, including computing the size of address table space required for an input graphic image and dividing it into cell spaces;
  determining if all graphic data items of the image have been processed, and if they have, ending the storage program, and if they have not, determining if all address pointers for the graphic image have been processed;
  if all address pointers have not been processed, identifying a cell from coordinates of points in the graphic image, computing an address pointer of the cell, finding an empty space within the address data table, and storing the address pointer in the empty space of the address table according to the steps of forming an address table; and
  thereafter returning to the determination if all address pointers of the graphic image having been processed.

18. The method of claim 17, wherein said step of forming an address data table includes forming a field with each address pointer that identifies the cell having the graphic data in the graphic data table pointed to by the pointer.

19. The method of claim 1, including determining the address of a different cell than said pertinent cell within the address data table by the address of the pertinent cell within the address data table and a fixed number unique to the physical location of the different cell relative to the pertinent cell in the graphic image, which is the same for the same physical relationship between any cell as a pertinent cell and its different cells within the graphic image.

20. The method of claim 4, including determining the address of a different cell than said pertinent cell within the address table by the address of the pertinent cell within the address data table and a fixed number unique to the physical location of the different cell relative to the pertinent cell in the graphic image, which is the same for the same physical relationship between any cell as a pertinent cell and its different cells within the graphic image.

21. The method of claim 20, wherein the fixed physical location for the different cells is based on the criteria of physically directly adjacent cells in the graphic image.

22. The method of claim 14, wherein said step of providing a graphic data table stores graphic data for the cells in random order independent of the position of the cells relative to the graphic image.

23. The method of claim 22, wherein said step of providing a graphic data table stores graphic data for end points, for node points, and an intersection with the pertinent cell boundary of reach line in or passing through the pertinent cell.

24. The method of claim 1, wherein the spaces are all of the same fixed capacity.

25. The method of claim 1, wherein the cells are all of equal size.

26. A graphic data handling method, comprising:
  dividing a graphic image of figures into a plurality of graphic cells;
  storing graphic data for defining the figures within the cells;
  providing a plurality of memory spaces respectively assigned one-to-one to the cells, for normally storing therein memory address pointers for the graphic data, which memory address pointers respectively correspond to the figures in the cells; and
  when a memory address pointer for the graphic data that corresponds to the figures in a pertinent cell cannot be stored in the memory space assigned to the pertinent cell due to an overflow condition in the memory space assigned to the pertinent cell, substitutionally storing said memory address pointer for the pertinent cell that cannot be so stored, in a memory space, as an overflow memory space, which is assigned to a different cell other than said pertinent cell.

27. The method of claim 26, including storing information indicative of the substitutional storing in the memory space of the pertinent cell of the address data table, and wherein said step of providing a graphic data table stores graphic data for the cells in random order independent of the position of the cells relative to the graphic image.

28. The method of claim 27, wherein said step of providing a graphic data table stores graphic data for end points, for node points, and an intersection with the pertinent cell boundary for each line in or passing through the pertinent cell.

29. A graphic data handling system to be operated by a computer system having a graphic data storage program, a graphic data searching program, a memory containing the address data table, a memory containing the graphic data table, an input device for inputting the graphic image, and a data output device for outputting searching program results, comprising:
  means for dividing a graphic image of figures into a plurality of graphic cells;
  means for storing graphic data for defining the figures within the cells in a graphic data table in random order independent of the position of the cells relative to the graphic image;
  means for providing an address data table which includes a plurality of memory spaces of fixed capacity respectively assigned one-to-one to the cells, and for normally storing therein memory address pointers to the graphic data table, which memory address pointers respectively correspond to the figures in the cells;
  means for substitutionally storing a memory address pointer for a pertinent cell in a memory space, as an overflow memory space, which is assigned to a cell which is different from the cell assigned to the pertinent cell, when the memory address pointer cannot be stored in the memory space assigned to the pertinent cell; and
  means for storing information indicative of the substitutional storing in the memory space of the pertinent cell of the address data table.

30. The system of claim 29, wherein said means for providing an address data table provides the memory spaces corresponding to the cells in a computer memory sequentially in a fixed order dependent upon the positions of the cells in the graphic image.

31. A system of claim 29, including means for retrieving graphic data from the graphic data table including means for transposing an area that is only a part of the graphic image into a representation of the cells within the area, means for searching the memory spaces of the address data table corresponding to the cells of the area and memory spaces having substitutional storing of address pointers of the area, without searching the memory spaces corresponding to the remaining cells of the graphic image and determining address pointers therein assignable to the area and means for fetching from computer memory the graphic data in the graphic data table using only the pointers found by said means for searching.

32. The system according to claim 29, further including means for storing a plurality of bits corresponding in number to said different cells having a specific physical relationship with the pertinent cell that is the same for each cell of the graphic image, and setting the bits to indicate which ones of the memory spaces assigned to said different cells contain memory address pointers for the graphic data of the pertinent cell.

33. The system of claim 30, including means for determining the address of a different cell than the pertinent cell within the address data table by the address of the pertinent cell within the address data table and a fixed number unique to the physical location of the different cell relative to the pertinent cell in the graphic image, which is the same for the same physical relationship between any cell as a pertinent cell and its different cells within the graphic image.

34. The system of claim 30, including means for retrieving graphic data from the graphic data table including means for transposing an area that is only a part of the graphic image into a representation of the cells within the area, means for searching the memory spaces of the address data table corresponding to the cells of the area and memory spaces having substitutional storing of address pointers of the area, without searching the memory spaces corresponding to the remaining cells of the graphic image and determining address pointers therein assignable to the area and means for fetching from computer memory the graphic data in the graphic data table using only the pointers found by said means for searching.

35. The system of claim 30, further including means for storing a plurality of bits corresponding in number to the different cells having a specific physical relationship with the pertinent cell that is the same for each cell of the graphic image, and setting the bits to indicate which ones of the memory spaces assigned to said different cells contain memory address pointers for the graphic data of the pertinent cell.

36. The system of claim 34, further including means for storing a plurality of bits corresponding in number to the different cells having a specific physical relationship with the pertinent cell that is the same for each cell of the graphic image, and setting the bits to indicate which ones of the memory spaces assigned to said different cells contain memory address pointers for the graphic data of the pertinent cell.

37. The system of claim 36, including means for determining the address of one of said different cells within the address data table by the address of the pertinent cell within the address data table and a fixed number unique to the physical location of the different cell relative to the pertinent cell in the graphic image, which is the same for the same physical relationship between any cell as a pertinent cell and its different cells within the graphic image.

38. The system of claim 34, including means for determining the address of a different cell than said pertinent cell within the address data table by the address of the pertinent cell within the address data table and a fixed number unique to the physical location of the different cell relative to the pertinent cell in the graphic image, which is the same for the same physical relationship between any cell as a pertinent cell and its different cells within the graphic image.

39. The system of claim 35, including means for determining the address of a different cell than said pertinent cell within the address data table by the address of the pertinent cell within the address data table and a fixed number unique to the physical location of the different cell relative to the pertinent cell in the graphic image, which is the same for the same physical relationship between any cell as a pertinent cell and its different cells within the graphic image.

40. The system of claim 31, further including means for storing a plurality of bits corresponding in number to the different cells having a specific physical relationship with the pertinent cell that is the same for each cell of the graphic image, and setting the bits to indicate which one of the memory spaces assigned to the different cells contain memory address pointers for the graphic data of the pertinent cell.

* * * * *